United States Patent
Lin (10) Patent No.: US 9,346,000 B2
(45) Date of Patent: May 24, 2016

(54) AIR FILTER

(71) Applicant: PRO-PURE INC., New Taipei (TW)

(72) Inventor: Hsiang-Chi Lin, New Taipei (TW)

(73) Assignee: PRO-PURE INC., New Taipei (TW)

( * ) Notice: Subject to any disclaimer, the term of this patent is extended or adjusted under 35 U.S.C. 154(b) by 133 days.

(21) Appl. No.: 14/489,773

(22) Filed: Sep. 18, 2014

(65) Prior Publication Data

US 2016/0030872 A1 Feb. 4, 2016

(30) Foreign Application Priority Data

Jul. 30, 2014 (TW) .............................. 103126106 A (51) Int. Cl.
| | | |
|---|---|---|
| *B01D 46/00* | (2006.01) | |
| *B01D 46/52* | (2006.01) | |
| *F02M 35/02* | (2006.01) | |
| *F02M 35/024* | (2006.01) | |

(52) U.S. Cl.
CPC .......... *B01D 46/0005* (2013.01); *B01D 46/525* (2013.01); *B01D 46/527* (2013.01); *F02M 35/0201* (2013.01); *F02M 35/0203* (2013.01); *F02M 35/02416* (2013.01); *B01D 2271/022* (2013.01)

(58) Field of Classification Search
CPC ............. B01D 46/0005; B01D 46/525; B01D 46/527; B01D 2265/029; B01D 2271/022; F02M 35/0201; F02M 35/0203; F02M 35/02416; F02M 35/02483
See application file for complete search history.

(56) References Cited

U.S. PATENT DOCUMENTS

| | | | |
|---|---|---|---|
| 3,385,038 A | | 5/1968 | Davis |
| 4,498,989 A | * | 2/1985 | Miyakawa ........... B01D 29/012 210/450 |
| 6,190,432 B1 | | 2/2001 | Gieseke et al. |
| 7,713,324 B2 | | 5/2010 | Linhart et al. |
| 7,905,936 B2 | * | 3/2011 | Coulonvaux ....... B01D 46/0023 55/357 |
| 7,909,954 B2 | | 3/2011 | Johnston et al. |
| 8,034,144 B2 | | 10/2011 | Gieseke et al. |
| 8,221,567 B2 | | 7/2012 | Tate et al. |
| 2002/0184864 A1 | * | 12/2002 | Bishop .................. B01D 25/001 55/498 |
| 2009/0266041 A1 | * | 10/2009 | Schrage ............. B01D 46/0005 55/498 |
| 2011/0197556 A1 | * | 8/2011 | Brown ................. B01D 46/527 55/498 |

FOREIGN PATENT DOCUMENTS

| | | |
|---|---|---|
| EP | 1714689 B1 | 10/2006 |
| TW | 577485 | 2/2004 |
| TW | I246964 | 1/2006 |
| TW | M287871 | 2/2006 |
| WO | 01/37969 A1 | 5/2001 |

\* cited by examiner

*Primary Examiner* — Robert Clemente
(74) *Attorney, Agent, or Firm* — patenttm.us (57) ABSTRACT

An air filter has a housing, a filter core, a resilient abutting element, a sleeve, a threaded rod bracket, a threaded rod and a nut. The axial sealing is achieved by axially compressing the resilient abutting element, such that the user does not have to apply much physical effort to compress the resilient abutting element. The user can easily push the filter core into the housing, and then rotates and tightens the nut, which can axially compress the resilient abutting element. It is easy to apply force on rotating the nut, and better still, the nut can be rotated by an electric tool, which further facilitates the convenience in assembling. Besides, the nut only abuts the sleeve, and the threaded rod bracket does not abut the filter core. Consequently, the filter core is not blocked, thereby making the air smoothly pass through the filter core.

11 Claims, 10 Drawing Sheets

AIR FILTER

CROSS-REFERENCE TO RELATED APPLICATIONS

This application is based upon and claims priority under 35 U.S.C. 119 from Taiwan Patent Application No. 103126106 filed on Jul. 30, 2014, which is hereby specifically incorporated herein by this reference thereto.

BACKGROUND OF THE INVENTION

1. Field of the Invention

The present invention relates to an air filter, especially to an air filter for filtering suspended particles from air.

2. Description of the Prior Arts

Figure 8:
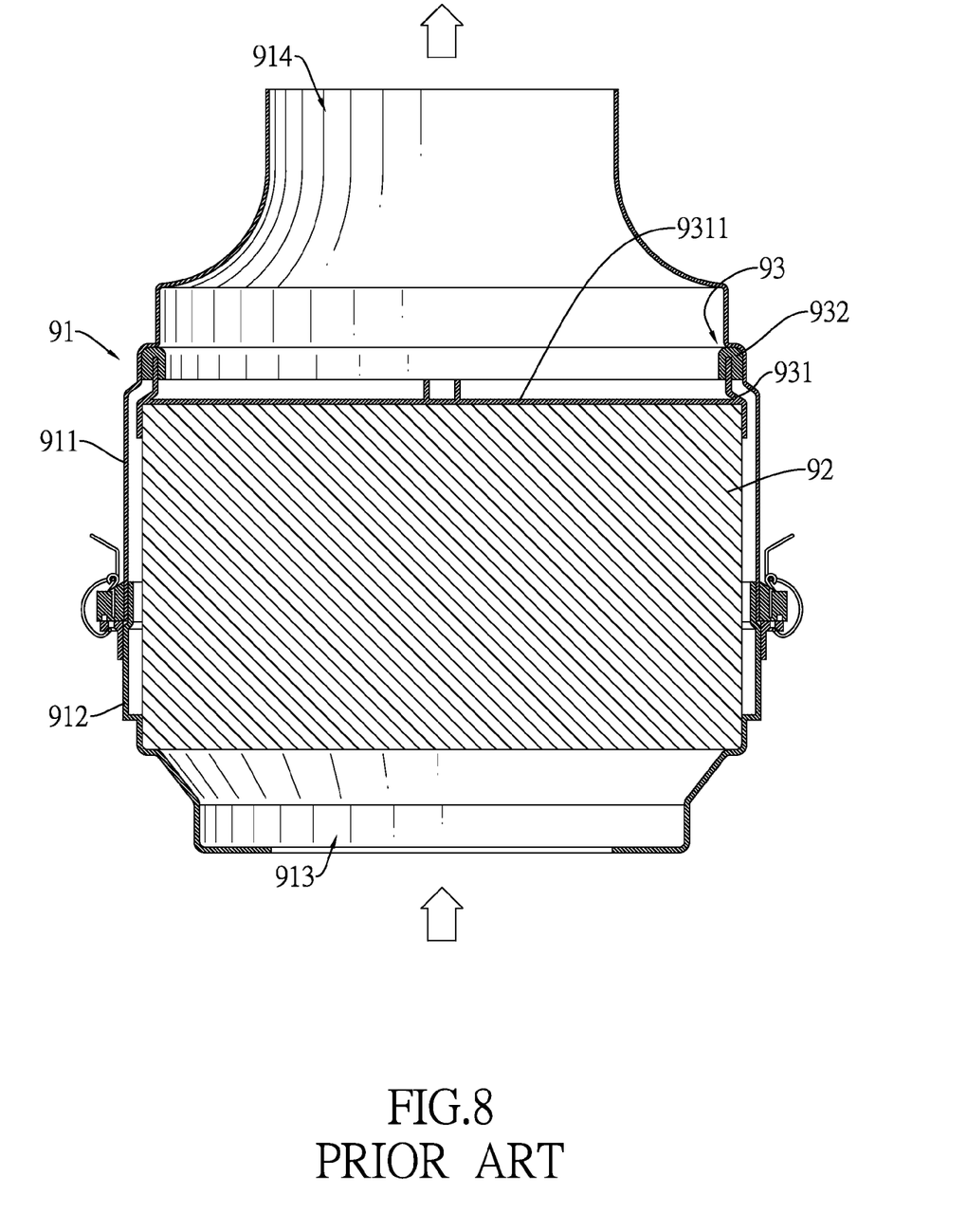
FIG. 8 is a side view in partial section of a conventional air filter in accordance with the prior art.

An air filter is a device for filtering suspended particles from air, and is usually installed in a ventilation system of a building, an air compressor, or an engine of a vehicle. The conventional air filter such as an air cleaner disclosed in U.S. Pat. No. 6,190,432 as shown in FIG. 8 comprises a housing 91, a filter core 92 and a sealing system 93. The housing 91 has a first housing 911 and a second housing 912. The first and second housings 911, 912 are assembled together, and an accommodating space is formed between the first and second housings 911, 912. The first housing 911 has an outlet 914 communicating with the accommodating space. The second housing 912 has an inlet 913 communicating with the accommodating space.

Figure 9:
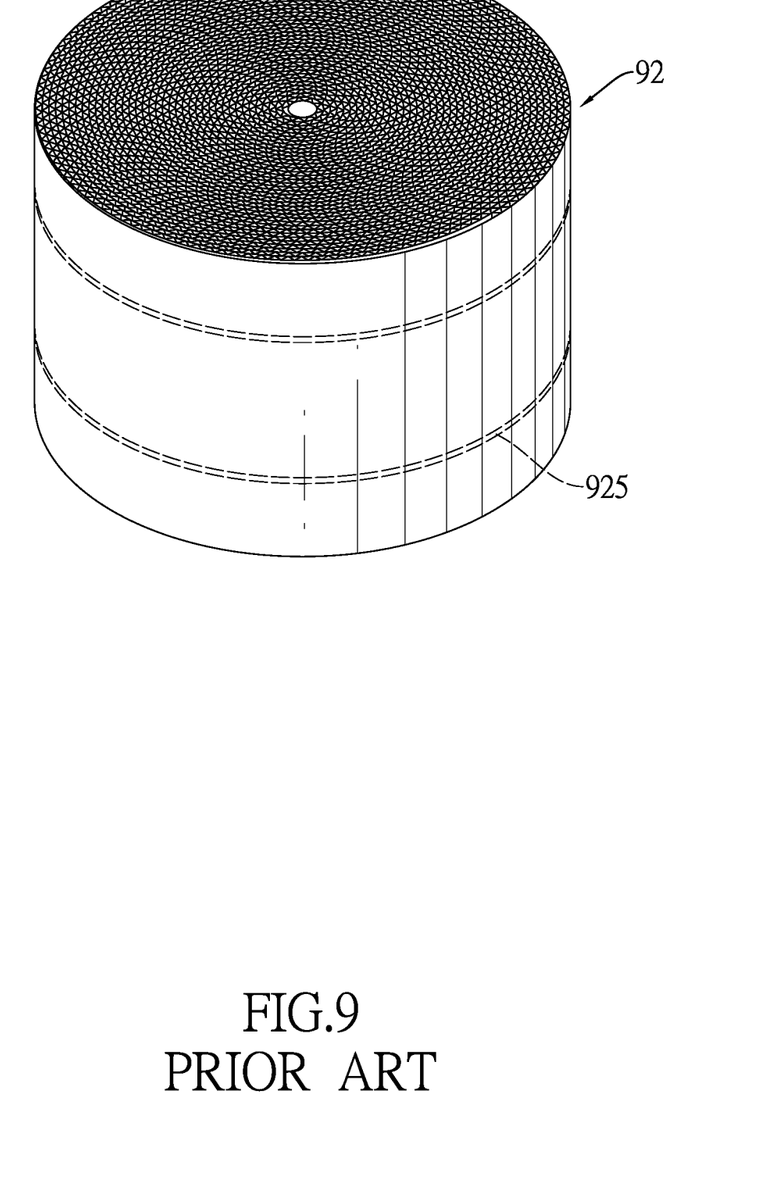
FIG. 9 is a perspective view of a filter core of the air filter in FIG. 8.
Figure 10:
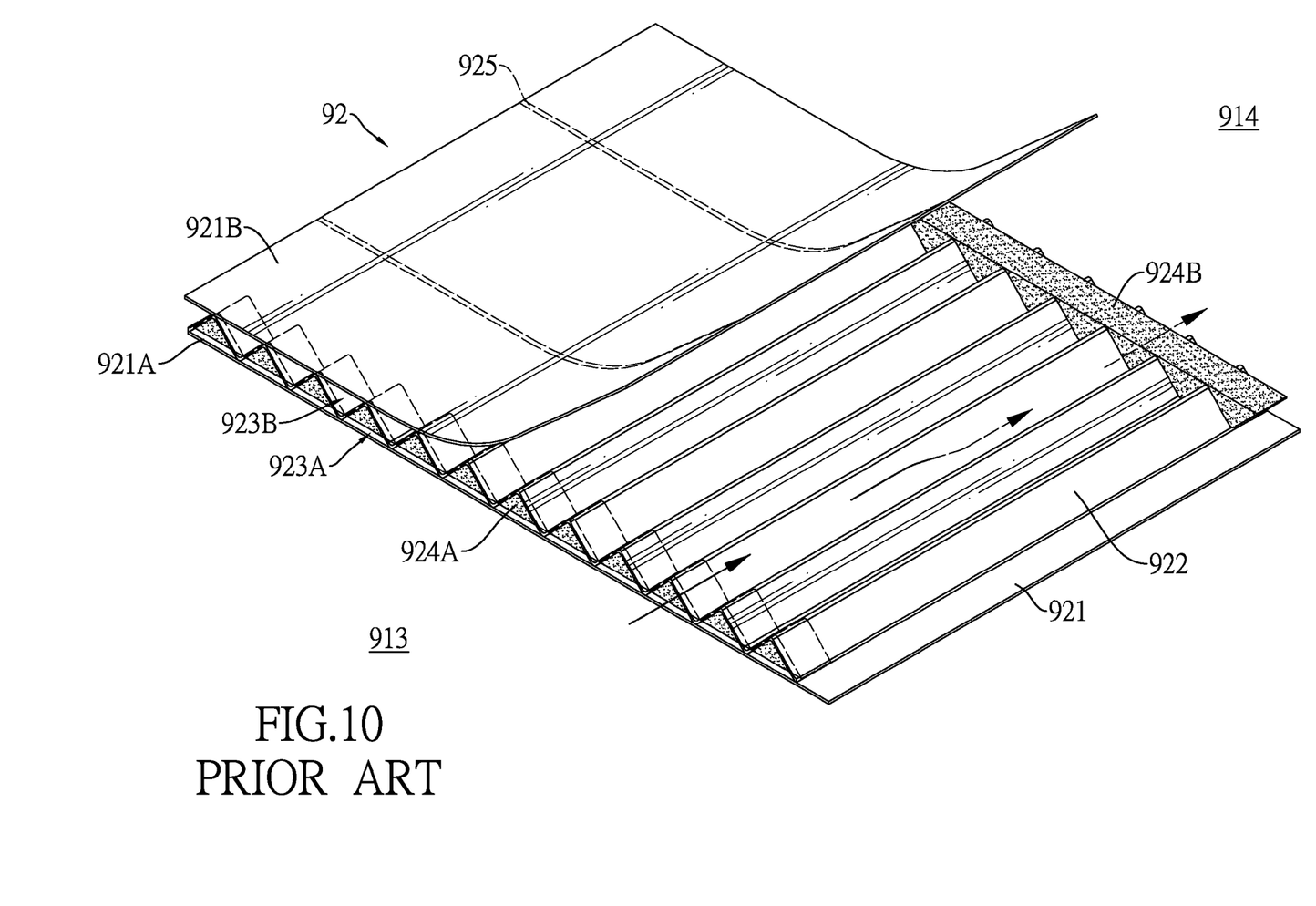
FIG. 10 is a partial operational perspective view of the filter core of the air filter in FIG. 8, showing the filter core expanded.

With reference to FIGS. 8 to 10, the filter core 92 is mounted in the accommodating space and has a wavy filtering sheet 922 and a flat filtering sheet 921, both for filtering suspended pollutants. The wavy filtering sheet 922 and the flat filtering sheet 921 are rolled into a cylinder and are alternately stacked to form multiple layers of the wavy filtering sheet 922 and layers of the flat filtering sheet 921. Thus, two surfaces of each layer of the wavy filtering sheet 922 are respectively flush with two adjacent layers of the flat filtering sheet 921. Multiple channels 923A, 923B are formed between each layer of the wavy filtering sheet 922 and the two adjacent layers of the flat filtering sheet 921A, 921B. An end sealing adhesive layer 924A is adhered between each layer of the wavy filtering sheet 922 at the side adjacent to the inlet 913 and one of the layers of the flat filtering sheet 921A that are adjacent to said layer of wavy filtering sheet 922. Thus, the channels 923A between said layer of the wavy filtering sheet 922 and said layer of the flat filtering sheet 921A are sealed at the side adjacent to the inlet 913. Another end sealing adhesive layer 924B is adhered between said layer of the wavy filtering sheet 922 at the side adjacent to the outlet 914 and the other layer of the flat filtering sheet 921B that is adjacent to said layer of the wavy filtering sheet 922. Thus, the channels 923B between said layer of the wavy filtering sheet 922 and said layer of the flat filtering sheet 921B are sealed at the side adjacent to the outlet 914. As a result, the air to be filtered enters the cylinder-rolled filter core 92 from the inlet 913 of the second housing 912, and then enters channels 923B, which are not sealed at the side adjacent to the inlet 913. Afterwards, the air axially moves to the other end of the channels 923B, and is unable to flow out from the filter core 92 due to the end sealing adhesive layer 924B. Thus, the air would pass through the layer of the wavy filtering sheet 922 to arrive at another channels 923A, such that the air can flow out from the filter core 92 to arrive at the outlet 914. When the air passes through the layer of the wavy filtering sheet 922, the wavy filtering sheet 922 filters the suspended particles from the air to clean the air. In addition, the air may pass through the layer of the flat filtering sheet 921B to arrive at another channel, and said layer of the flat filtering sheet 921B also can filter the suspended particles from the air.

With reference to FIG. 8, the sealing system 93 has an annular frame 931 and a seal member 932. The annular frame 931 is mounted around the filter core 92 in an end adjacent to the outlet 914. The seal member 932 is mounted around the annular frame 931 in an end adjacent to the outlet 914, and transversely abuts an inner wall of the first housing 911. The seal member 932 is made of pressable and resilient material, and an original outer diameter of the seal member 932 is bigger than an inner diameter of the first housing 911 at a position corresponding to the seal member 932. The seal member 932 is pressed transversely to transversely and tightly abut the inner wall of the first housing 911, thereby transversely sealing a gap between the filter core 92 and the first housing 911. Accordingly, the air to be filtered must pass through the filter core 92 to arrive at the outlet 914.

However, the conventional air filter has the following shortcomings.

First, the sealing system 93 seals the gap between the filter core 92 and the first housing 911 by transversely compressing the seal member 923, and thus the outer diameter of the seal member 923 is bigger than the inner diameter of the corresponding position of the first housing 911 as mentioned above. Accordingly, installing the sealing system 93 into the first housing 911 is difficult, since the user has to apply much physical force to push the sealing system 93 into the first housing 911.

Second, with reference to FIGS. 9 and 10, the conventional wavy filtering sheet 922 and the flat filtering sheet 921 are adhered to each other by adhesives 925. The adhesives 925 are spread on a surface of the flat filtering sheet 921 and extended along an elongated side of the flat filtering sheet 921. Since the wavy filtering sheet 922 undulates as a wave, the flat filtering sheet 921 only adheres to a small part of peaks of the wavy filtering sheet 922, and thus the adhered area between the flat filtering sheet 921 and the wavy filtering sheet 922 are too small to securely connect the filtering sheets 921, 922 to each other. Besides, the adhesives 925 are spread between any two peaks, and thus occupy a part of the space of the channels 923A, 923B, thereby interfering with the flowing of the air. In addition, since the adhesives 925 are spread on only one surface of the flat filtering sheet 921, each layer of the wavy filtering sheet 922 is only adhered to one of the layers of the flat filtering sheet 921B, and is not adhered to the other layer of the flat filtering sheet 921B. As a result, the connection between the flat filtering sheet 921 and the wavy filtering sheet 922 is not strong enough. After in use for a period of time, the wavy filtering sheet 922 and the flat filtering sheet 921 may have stained with suspended particles, which lower the filtering efficiency. Therefore, to clean the wavy filtering sheet 922 and the flat filtering sheet 921, clean air is blown into the filtering core from the outlet 914. When the clean air passes through the wavy filtering sheet 922 and the flat filtering sheet 921 in a reverse direction, the air brings the stained suspended particles out of the filtering sheets 921, 922, and the air is blown out of the inlet 913 together with the suspended particles. However, the connection between the flat filtering sheet 921 and the wavy filtering sheet 922 is not strong enough, and there is no annular frame 931 in an end adjacent to the inlet 913 to axially abut the filter core 92. Consequently, as the air blows, the layers of the wavy filtering sheet 922 and the flat filtering sheet 921 in the center of the filter core 92 may separate from each other and axially protrude out along the blowing direction of the air, which causes the filter core 92 to be dysfunctional.

Third, with reference to FIG. 8, as mentioned above, the annular frame 931 axially abuts and fixes the filter core 92. The annular frame 931 has multiple connecting ribs 9311. The connecting ribs 9311 are transversely connected to an inner wall of the annular frames 931, and axially abut the filter core 92. However, the connecting ribs 9311 also block the channels of the filter core 92 at the abutment position of the connecting ribs 9311, and thus the air flow is interfered.

To overcome the shortcomings, the present invention provides an air filter to mitigate or obviate the aforementioned problems.

SUMMARY OF THE INVENTION

The main objective of the present invention is to provide an air filter that has an easily-installed filter core.

The air filter has a housing, a filter core, a resilient abutting element, a sleeve, a threaded rod bracket, a threaded rod, and a nut. The housing has an accommodating space, an inlet, an outlet, and a first stepped surface. The inlet and the outlet communicate with the accommodating space. The first stepped surface is formed annularly around an inner wall of the housing. The filter core is mounted in the accommodating space of the housing, and has a through hole. The through hole is formed axially through a center of the filter core. An outer diameter of the filter core is bigger than an inner diameter of an inner periphery of the first stepped surface of the housing. The resilient abutting element is annularly formed on a periphery of an end surface of the filter core that is adjacent to the outlet, transversely and axially wraps said periphery, and axially abuts the first stepped surface of the housing. The sleeve is mounted in the through hole of the filter core, and is adhered to a hole wall of the through hole. The threaded rod bracket is mounted securely in the accommodating space of the housing, and is disposed between the filter core and the outlet. The threaded rod is mounted securely on the threaded rod bracket, and is axially mounted through the sleeve. The nut is mounted around and is screwed on the threaded rod, axially abuts the sleeve in a direction toward the outlet, such that the resilient abutting element axially and tightly abuts the first stepped surface of the housing via the sleeve and the filter core to axially seal a gap between the first stepped surface and the filter core.

The axial sealing is achieved by axially compressing the resilient abutting element, such that the user does not have to apply much physical effort to compress the resilient abutting element. The user can easily push the filter core into the housing, and then rotates and tightens the nut, which can axially and indirectly compress the resilient abutting element. It is easy to apply force on rotating the nut, and better still, the nut can be rotated by an electric tool, which further facilitates the convenience in assembling the filter core into the housing. In addition, the nut only abuts the sleeve, and the threaded rod bracket does not abut the filter core. Therefore, two axial end surfaces of the filter core are almost completely unblocked, thereby ensuring the air can smoothly pass through the filter core.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
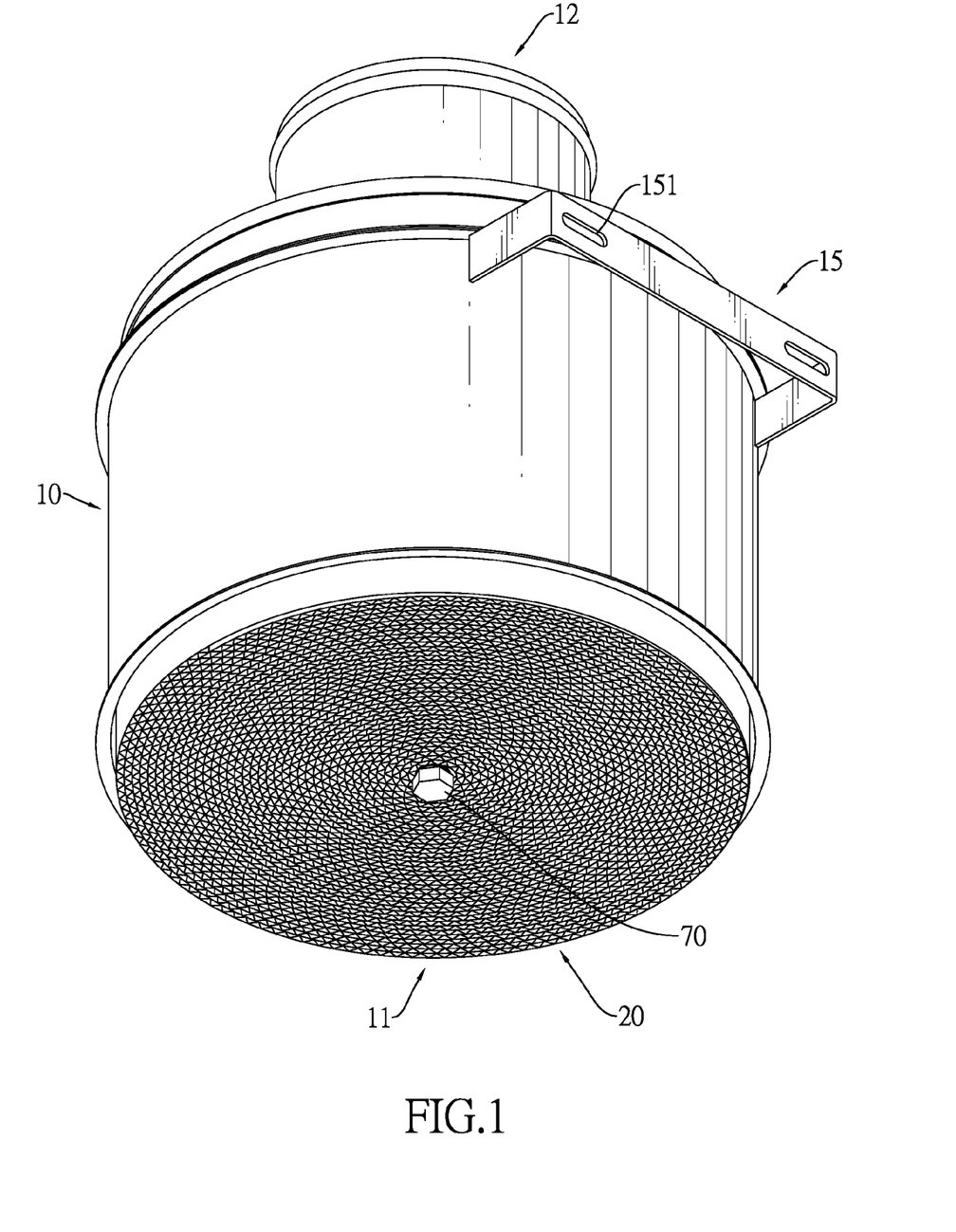
FIG. 1 is a perspective view of an air filter in accordance with the present invention.
Figure 2:
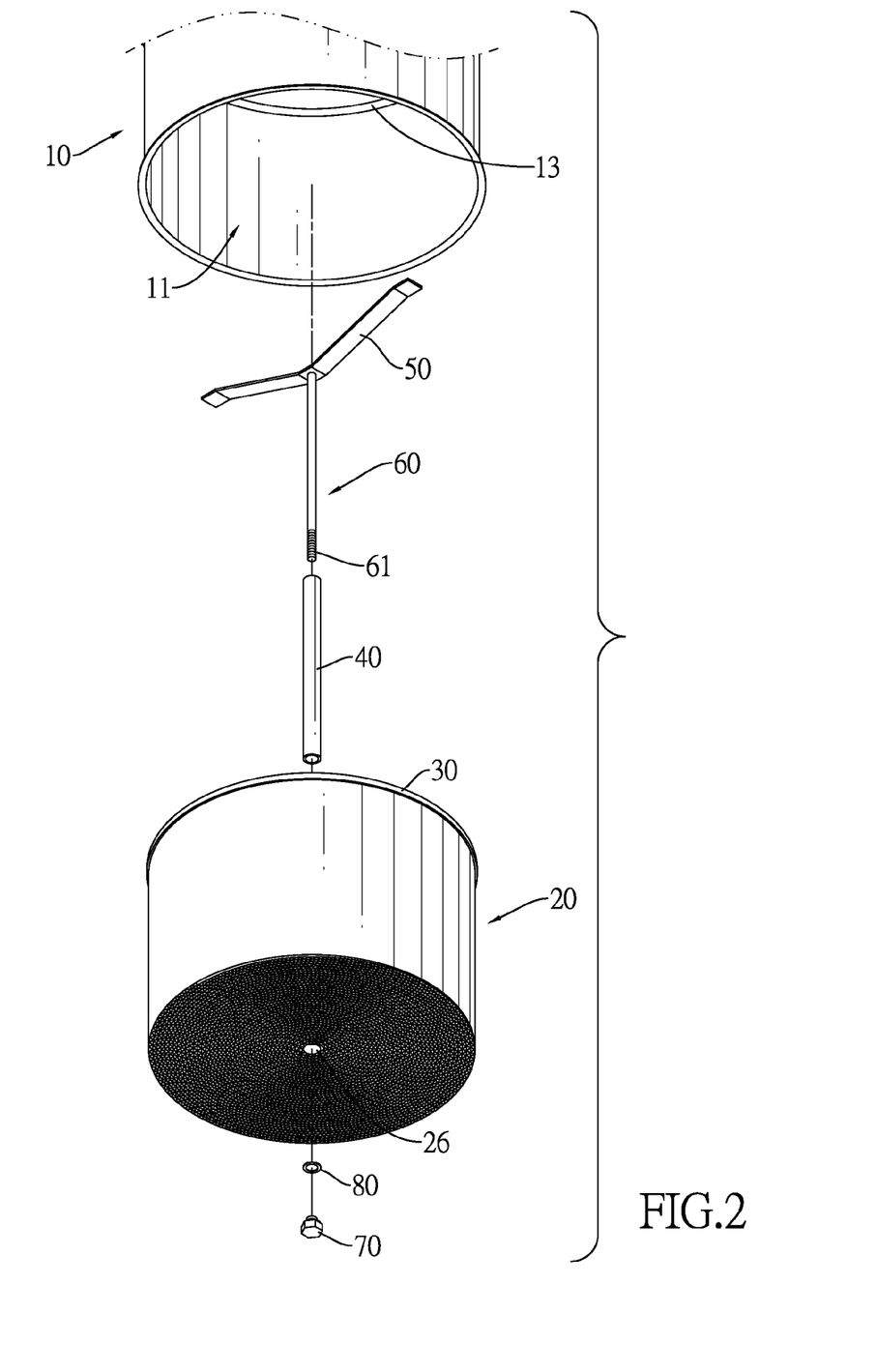
FIG. 2 is an exploded perspective view of the air filter in FIG. 1.

With reference to FIGS. 1 and 2, an air filter in accordance with the present invention comprises a housing 10, a filter core 20, a resilient abutting element 30, a sleeve 40, a threaded rod bracket 50, a threaded rod 60, a nut 70, and a spacer 80.

Figure 3:
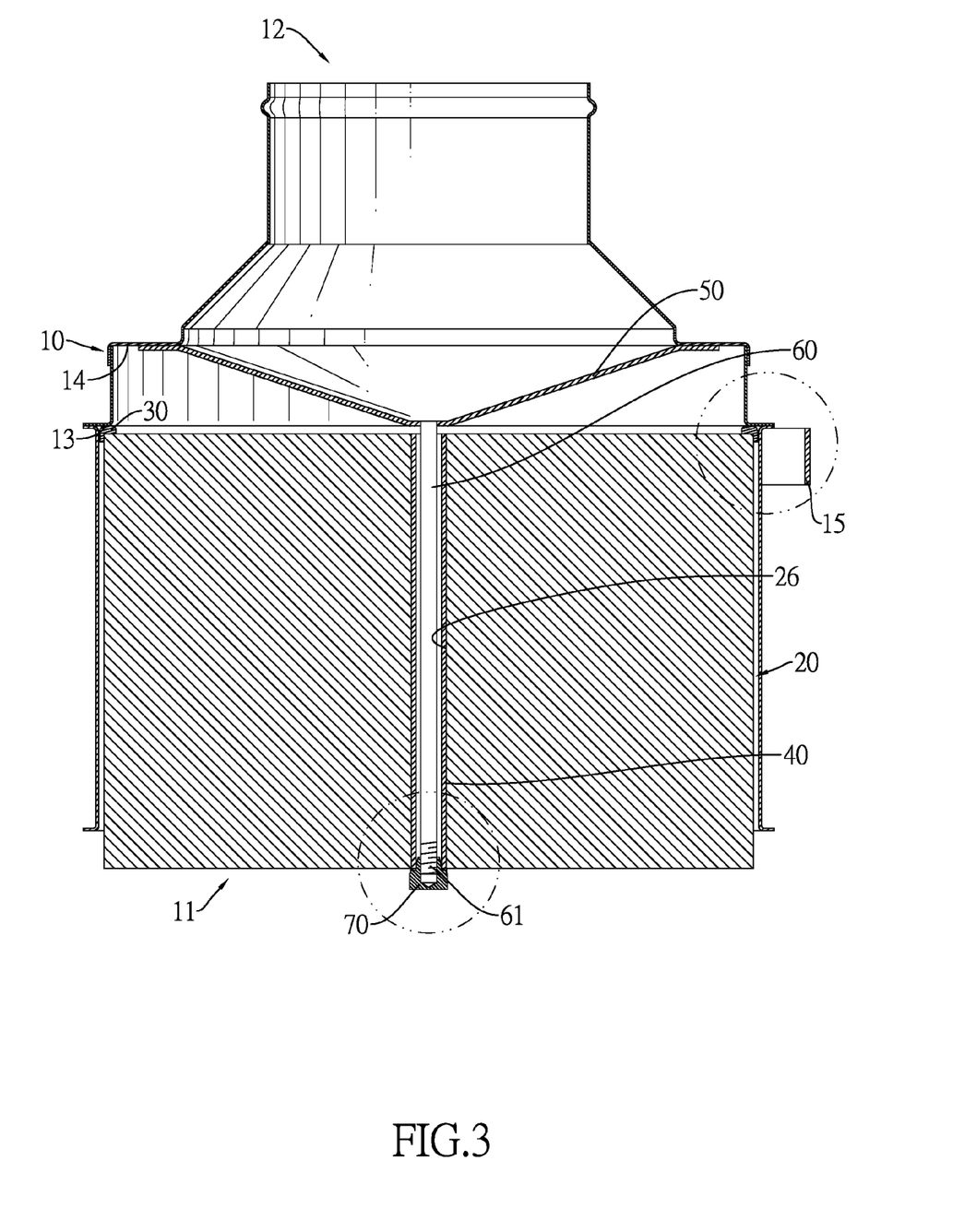
FIG. 3 is a side view in partial section of the air filter in FIG. 1.

With reference to FIGS. 1 to 3, the housing 10 has an accommodating space, an inlet 11, an outlet 12, a first stepped surface 13, and a second stepped surface 14. The inlet 11 and the outlet 12 communicate with the accommodating space. The first stepped surface 13 and the second stepped surface 14 are formed annularly around an inner wall of the housing 10. The second stepped surface 14 is disposed between the first stepped surface 13 and the outlet 12. An inner diameter of an inner periphery of the second stepped surface 14 is smaller than an inner diameter of an inner periphery of the first stepped surface 13 as shown in FIG. 3. In a preferred embodiment, an inner diameter of the housing 10 remains unchanged from the first stepped surface 13 to the inlet 11. A fixing bracket 15 is mounted securely on an outer wall of the housing 10, is made of a bent elongated sheet, and has two elongated holes 151 formed through the fixing bracket, thereby facilitating convenience in assembling the fixing bracket on another object.

Figure 4:
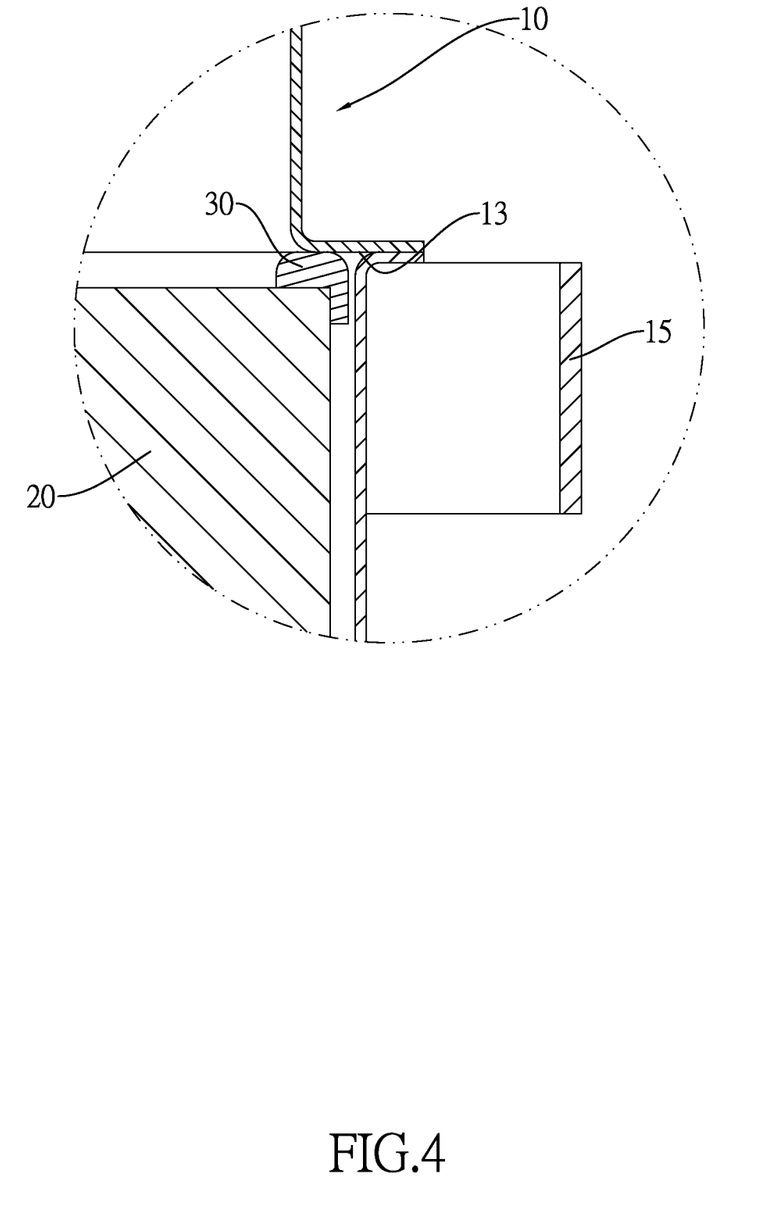
FIG. 4 is an enlarged side view in partial section of a resilient abutting element of the air filter in FIG. 1.
Figure 6:
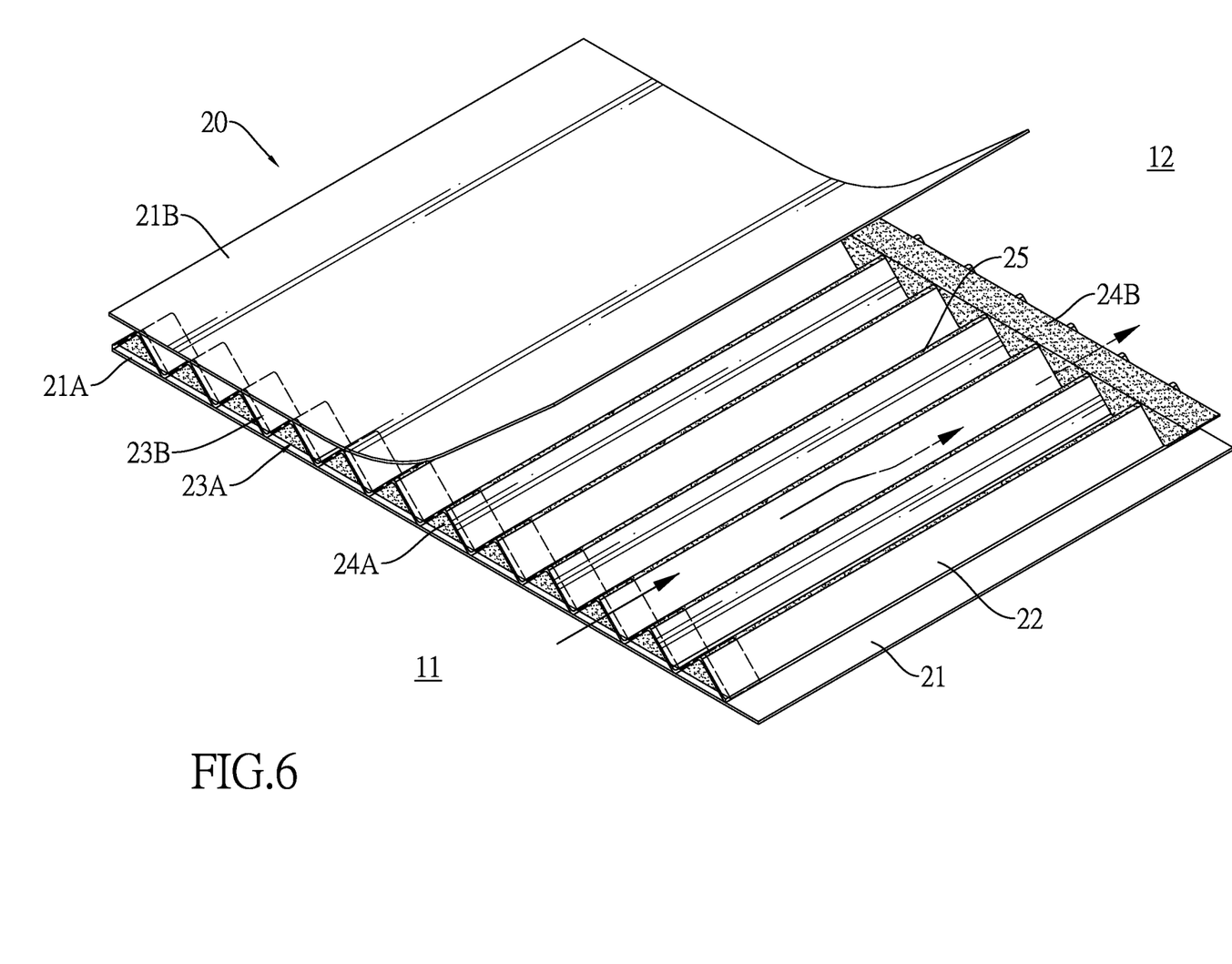
FIG. 6 is a partial operational perspective view of a filter core of the air filter in FIG. 1, showing the filter core expanded.
Figure 7:
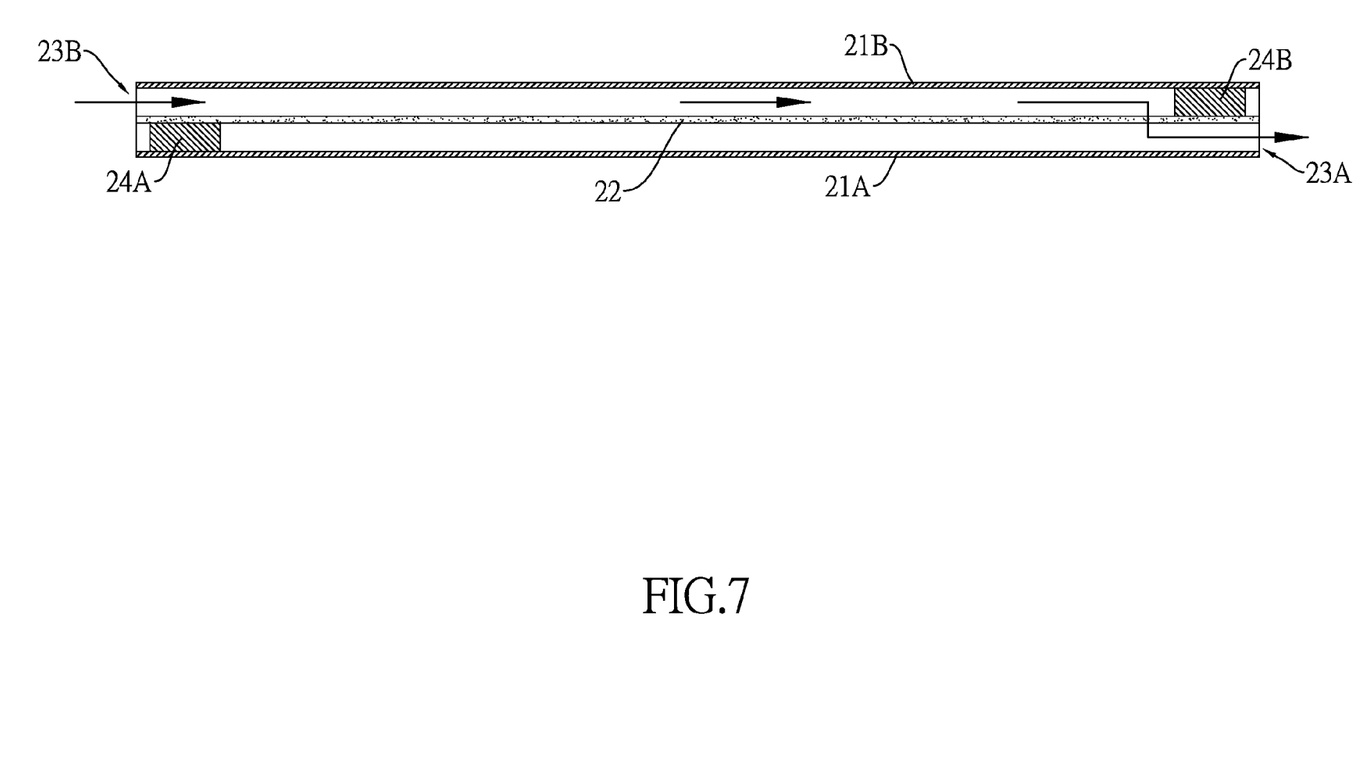
FIG. 7 is an operational side view in partial section of the filter core of the air filter in FIG. 1, showing the filter core expanded.

The filter core 20 is mounted in the accommodating space of the housing 10 and has two axial end surfaces and a through hole 26. The through hole 26 is formed axially through a center of the filter core 20. With reference to FIGS. 6 and 7, the filter core 20 has a wavy filtering sheet 22, a flat filtering sheet 21, multiple adhesives 25, and two end sealing adhesive layers 24A, 24B. The wavy filtering sheet 22 and the flat filtering sheet 21 are for filtering suspended pollutants, are rolled into a cylinder, and are alternately stacked to form multiple layers of the wavy filtering sheet 22 and layers of the flat filtering sheet 21. Thus, two surfaces of each layer of the wavy filtering sheet 22 are respectively flush with two adjacent layers of the flat filtering sheet 21. Multiple channels 23A, 23B are formed between each layer of the wavy filtering sheet 22 and the two adjacent layers of the flat filtering sheet 21A, 21B. The adhesives 25 are respectively spread on the two surfaces of each layer of the wavy filtering sheet 22, and are respectively and axially spread along peaks of the surfaces of said layer of the wavy filtering sheet 22, to be respectively adhered securely with the two adjacent layers of the flat filtering sheet 21A, 21B. One of the end sealing adhesive layers 24A is adhered between each layer of the wavy filtering sheet 22 at the side adjacent to the inlet 11 and one of the layers of the flat filtering sheet 21A that are adjacent to said layer of the wavy filtering sheet 22. Thus, the channels 23A between said layer of the wavy filtering sheet 22 and said layer of the flat filtering sheet 21A are sealed at the side adjacent to the inlet 11. The other end sealing adhesive layer 24B is adhered between said layer of the wavy filtering sheet 22 at the side adjacent to the outlet 12 and the other layer of the flat filtering sheet 21B that is adjacent to said layer of the wavy filtering sheet 22. Thus, the channels 23B between said layer of the wavy filtering sheet 22 and said layer of the flat filtering sheet 21B are sealed at the side adjacent to the outlet 12. In a preferred embodiment, the adhesives 25 and the end sealing adhesive layers 24A, 24B are preferably, but not limited to, hot-melt adhesives or Polyurethane (PU) structural adhesives. The flat filtering sheet 21A, 21B and the wavy filtering sheet 22 do not need to be pre-heated when adhered by hot-melt adhesives or Polyurethane structural adhesives, thereby facilitating convenience in manufacturing the filter core 20. With reference to FIGS. 3 and 4, an outer diameter of the filter core 20 is bigger than the inner diameter of the inner periphery of the first stepped surface 13 of the housing 10, and the filter core 20 protrudes out of the inlet 11 of the housing 10.

With reference to FIGS. 2 to 4, the resilient abutting element 30 is annularly formed on a periphery of the end surface of the filter core 20 that is adjacent to the outlet 12, transversely and axially wraps said periphery as shown in FIG. 4, and axially abuts the first stepped surface 13 of the housing 10. In a preferred embodiment, an outer diameter of the resilient abutting element 30 is smaller than the inner diameter of the housing 10 from the first stepped surface 13 to the inlet 11, such that a transverse gap is formed between the resilient abutting element 30 and the inner wall of the housing 10 at a position corresponding to the resilient abutting element 30 as shown in FIG. 4. In a preferred embodiment, the resilient abutting element 30 is made of Polyurethane directly foaming on the periphery of the filter core 20. Preferably, a liquid colloid is filled by a mold into gaps between structure fibers of the filtering sheets 21, 22 of the filter core 20, and then the liquid adhesive is solidified to form the resilient abutting element 30. But the resilient abutting element 30 is not limited by the manufacturing method mentioned above, and also can be made by other manufacturing methods or other resilient materials, such as rubber and silica gel. In a preferred embodiment, an axial thickness of the resilient abutting element 30 protruding out of the end surface of the filter core 20 that is adjacent to the outlet 12 ranges, but is not limited to, from 5 mm to 10 mm, preferably 5 mm, and is not altered with variations of the outer diameter or an axial length of the filter core 20. In a preferred embodiment, a transverse thickness of the resilient abutting element 30 protruding out of an outer wall of the filter core 20 is, but not limited to, 2.5 mm, and is not altered with variations of the outer diameter or the axial length of the filter core 20.

Figure 5:
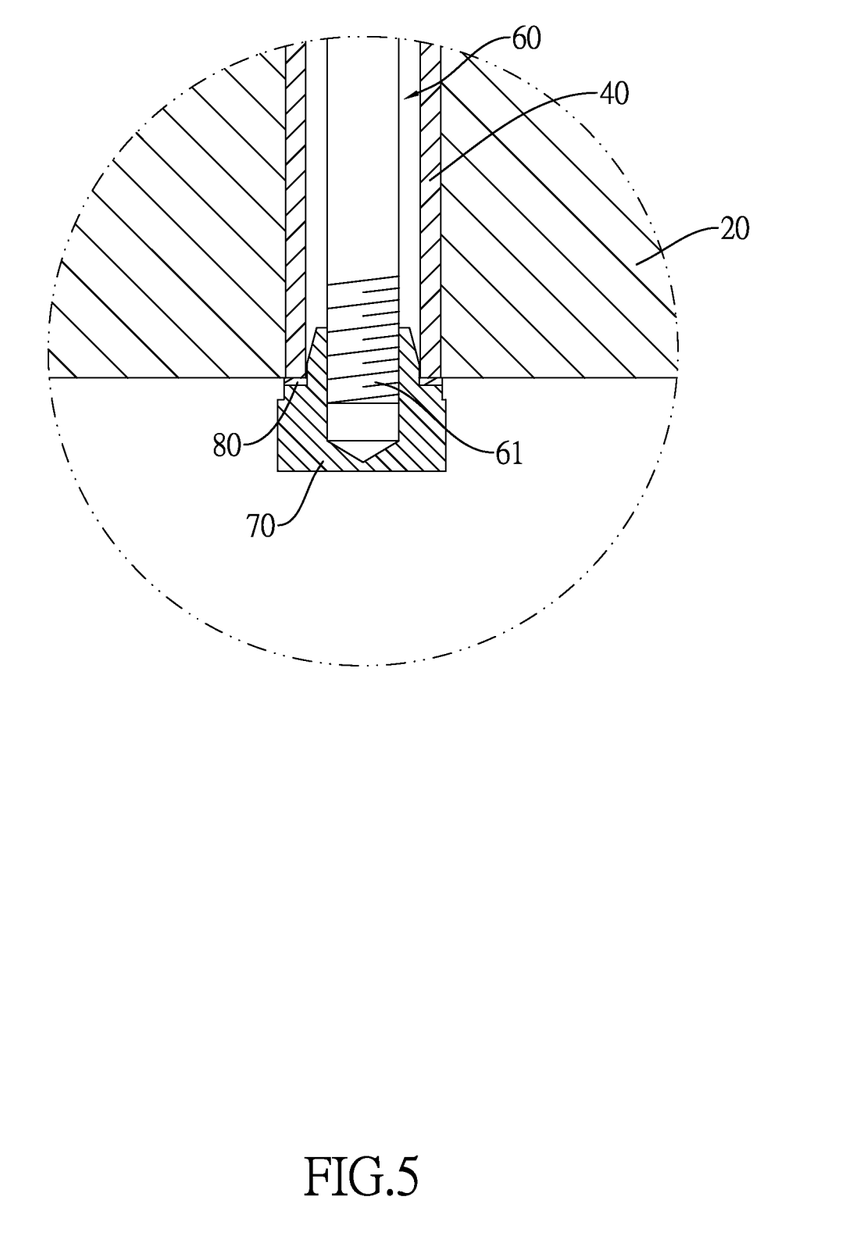
FIG. 5 is an enlarged side view in partial section of a nut of the air filter in FIG. 1.

With reference to FIGS. 2, 3 and 5, the sleeve 40 is mounted in the through hole 26 of the filter core 20, and is adhered to a hole wall of the through hole 26. Two ends of the sleeve 40 are respectively aligned with the end surfaces of the filter core 20.

With reference to FIGS. 2 and 3, the threaded rod bracket 50 is mounted securely in the accommodating space of the housing 10, and is disposed between the filter core 20 and the outlet 12. In a preferred embodiment, the threaded rod bracket 50 is an elongated sheet, and two ends of the elongated sheet are bent toward the outlet 12 to be axially welded securely to the second stepped surface 14 of the housing 10. A gap is formed between a middle of the elongated sheet and the filter core 20.

With reference to FIGS. 2, 3 and 5, the threaded rod 60 is welded securely to a middle of the threaded rod bracket 50, is axially mounted through the sleeve 40, and protrudes out of the end of the sleeve 40 that is adjacent to the inlet 11. In a preferred embodiment, outer threads 61 of the threaded rod 60 are formed only on a part of an outer wall of the threaded rod 60 that is adjacent to the end of the threaded rod 60, rather than all over the outer wall of the threaded rod 60.

The nut 70 is mounted around and is screwed on the threaded rod 60, axially abuts the sleeve 40 in a direction toward the outlet 12, such that the resilient abutting element 30 axially and tightly abuts the first stepped surface 13 of the housing 10 via the sleeve 40 and the filter core 20 to axially seal a gap between the first stepped surface 13 and the filter core 20 as shown in FIG. 4.

The spacer 80 is mounted around the threaded rod 60 and is axially clamped between the nut 70 and the corresponding end of the sleeve 40. In a preferred embodiment, outer diameters of the nut 70 and the spacer 80 are both slightly bigger than an outer diameter of the sleeve 40, but the nut 70 and the spacer 80 do not block the channels 23A, 23B of the filter core 20.

With reference to FIGS. 2 and 3, when the air filter of the present invention is assembled, the threaded rod bracket 50 and the threaded rod 60 are mounted securely in the housing 10 first. Then, the filter core 20, which has been assembled with the sleeve 40 and the resilient abutting element 30, is mounted in the housing 10 from the inlet 11, and is mounted around the threaded rod 60 at the same time. Since the outer diameter of the resilient abutting element 30 is smaller than the inner diameter of corresponding position of the housing 10 as shown in FIG. 4, the filter core 20 can be put into the housing 10 easily and smoothly. Afterwards, the spacer 80 and the nut 70 are assembled on the sleeve 40, and the nut 70 is rotated and tightened. Then the assembling of the air filter is completed. The air filter is easy to be assembled. In particular, the nut 70 not only allows easy application of the user's manual force for rotation, but also can be rotated by an electric tool, which enhances the efficiency of the assembling.

With reference to FIGS. 3 to 5, the nut 70 abuts the sleeve 40 when rotated, and the sleeve 40 is moved with the filter core 20 and the resilient abutting element 30, thereby making the resilient abutting element 30 axially and tightly abut the first stepped surface 13. Thus, the gap between the filter core 20 and the first stepped surface 13 can be effectively sealed as shown in FIG. 4, which ensures that the air entering the housing 10 from the inlet 11 will enter the filter core 20. In addition, the outer diameter of the filter core 20 is bigger than the inner diameter of the inner periphery of the first stepped surface 13, such that the filter core 20 may abut the resilient abutting element 30 tightly on the first stepped surface 13.

With reference to FIGS. 3 and 5, in addition, since the nut 70 only abuts the sleeve 40, and the threaded rod bracket 50 does not need to abut the filter core 20, the axial end surfaces of the filter core 20 are almost completely unblocked, thereby ensuring that air can smoothly pass through the filter core 20.

With reference to FIG. 3, moreover, since two ends of the threaded rod bracket 50 axially abut the second stepped surface 14, the threaded rod bracket 50 may be supported in an axial direction, which further strengthens the supporting of the threaded rod 60.

Nevertheless, when the filter core 20 is disassembled, since the filter core 20 protrudes out of the inlet 11 of the housing 10, the user can directly hold the filter core 20, which makes it easy for the user to apply force on and take out the filter core 20.

With reference to FIG. 1, the air filter of the present invention may be used in an air compressor or a diesel engine. When the air filter is in use, the air to be filtered directly enters the filter core 20, which protrudes out of the inlet 11 of the housing 10. With reference to FIGS. 6 and 7, the air enters the channels 23B, which are not sealed in the end surface of the filter core 20 that is adjacent to the inlet 11. Then, when the air moves in the channels 23B to the other end surface of the filter core 20, the air is blocked by the end sealing adhesive layer 24B. Consequently, the air passes through the wavy filtering sheet 22 to the other channels 23A, and then flows out of the filter core 20 to arrive at the outlet 12. When the air passes through the wavy filtering sheet 22, the wavy filtering sheet 22 filters the suspended particles from the air to clean the air. In addition, the air may pass through the flat filtering sheet 21B to arrive at another channel, and the flat filtering sheet 21B also can filter the suspended particles from the air.

Since the adhesives 25 are spread on both surfaces of the wavy filtering sheet 22, and are axially spread along the peaks of the wavy filtering sheet 22, the adhered area between the wavy filtering sheet 22 and the flat filtering sheet 21 is large enough, and thus the connection between the filtering sheets 21, 22 is strong enough. Therefore, no matter in use, wherein the air to be filtered enters the filter core 20 from the inlet 11, or in a filter core 20 cleaning situation, wherein the clean air enters the filter core 20 from the outlet 12, the wavy filtering sheet 22 and the flat filtering sheet 21 do not separate from each other, and do not axially protrude out along the direction of the air flow.

In addition, the adhesives 25 are axially spread along the peaks of the wavy filtering sheet 22, thereby preventing spaces of the channels 23A, 23B from being occupied by the adhesives 25 to further avoid interfering with the air flow.

With reference to FIG. 3, furthermore, with the resilient abutting element 30 axially abutting the periphery of the filter core 20 and the nut 70 axially abutting the sleeve 40, which is adhered with the filter core 20, both the resilient abutting element and the nut assist with preventing the wavy filtering sheet 22 and the flat filtering sheet 21 from separating from each other and axially protruding out.

In another embodiment, the filter core may be replaced by filter cores of other kinds, such as a filter core with adhesives spread not along the peaks but in other manners. In this situation, the embodiment also has the advantages of preventing the axial end surfaces of the filter core from being blocked.

In another embodiment, the outer diameter of the resilient abutting element may be equal to the inner diameter of the housing at a position corresponding to the resilient abutting element, thereby transversely supporting the resilient abutting element and the filter core firmly.

In another embodiment, the filter core may not protrude out of the inlet of the housing, and the housing further has a first housing and a second housing. The first and second housings are assembled together to form the accommodating space, and the filter core is mounted in the accommodating space.

In another embodiment, the housing may not have the second stepped surface, and the threaded rod bracket is transversely mounted securely on the inner wall of the housing.

In another embodiment, the threaded rod bracket may not be a bent elongated sheet but is of a different structure, as long as the threaded rod bracket can be mounted with and support the threaded rod.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An air filter comprising:
   a housing having
      an accommodating space;
      an inlet communicating with the accommodating space;
      an outlet communicating with the accommodating space; and
      a first stepped surface formed annularly around an inner wall of the housing;
   a filter core mounted in the accommodating space of the housing, and having
      a through hole formed axially through a center of the filter core; and
      an outer diameter bigger than an inner diameter of an inner periphery of the first stepped surface of the housing;
   a resilient abutting element annularly formed on a periphery of an end surface of the filter core that is adjacent to the outlet, transversely and axially wrapping said periphery, and axially abutting the first stepped surface of the housing;
   a sleeve mounted in the through hole of the filter core, and adhered to a hole wall of the through hole;
   a threaded rod bracket mounted securely in the accommodating space of the housing, and disposed between the filter core and the outlet;
   a threaded rod mounted securely on the threaded rod bracket, and axially mounted through the sleeve; and
   a nut mounted around and screwed on the threaded rod, axially abutting the sleeve in a direction toward the outlet, such that the resilient abutting element axially and tightly abuts the first stepped surface of the housing via the sleeve and the filter core to axially seal a gap between the first stepped surface and the filter core.

2. The air filter as claimed in claim 1, wherein the filter core has
   a wavy filtering sheet for filtering suspended pollutants;
   a flat filtering sheet for filtering suspended pollutants; the wavy filtering sheet and the flat filtering sheet rolled into a cylinder, and alternately stacked to form multiple layers of the wavy filtering sheet and layers of the flat filtering sheet;
   multiple adhesives respectively spread on two surfaces of each layer of the wavy filtering sheet, and respectively and axially spread along peaks of the surfaces of said layer of the wavy filtering sheet, to be respectively adhered securely with the two layers of the flat filtering sheet that are adjacent to said layer of the wavy filtering sheet; and
   two end sealing adhesive layers; one of the end sealing adhesive layers adhered between each layer of the wavy filtering sheet at the side adjacent to the inlet and one of the layers of the flat filtering sheet that are adjacent to said layer of the wavy filtering sheet; the other end sealing adhesive layer adhered between said layer of the wavy filtering sheet at the side adjacent to the outlet and the other layer of the flat filtering sheet that is adjacent to said layer of the wavy filtering sheet.

3. The air filter as claimed in claim 2, wherein the adhesives and the end sealing adhesive layers are hot-melt adhesives or Polyurethane structural adhesives.

4. The air filter as claimed in claim 1, wherein an outer diameter of the resilient abutting element is smaller than an inner diameter of the housing at a position corresponding to the resilient abutting element.

5. The air filter as claimed in claim 1, wherein the filter core protrudes out of the inlet.

6. The air filter as claimed in claim 1 further comprising a spacer mounted around the threaded rod and axially clamped between the nut and an end of the sleeve.

7. The air filter as claimed in claim 1, wherein
the housing further has
a second stepped surface formed annularly around the inner wall of the housing, disposed between the first stepped surface and the outlet; an inner diameter of an inner periphery of the second stepped surface is smaller than the inner diameter of the inner periphery of the first stepped surface; and
the threaded rod bracket is axially connected securely to the second stepped surface.

8. The air filter as claimed in claim 1, wherein the threaded rod bracket is an elongated sheet; two ends of the elongated sheet are bent toward the outlet to be connected to the housing; the threaded rod is mounted securely on a middle of the elongated sheet.

9. The air filter as claimed in claim 1, wherein the resilient abutting element is made of Polyurethane.

10. The air filter as claimed in claim 1, wherein an axial thickness the resilient abutting element protruding out of the end surface of the filter core that is adjacent to the outlet ranges from 5 mm to 10 mm.

11. The air filter as claimed in claim 1 further comprising a fixing bracket mounted securely on an outer wall of the housing and having at least one elongated hole formed through the fixing bracket.

* * * * *